United States Patent [19]

Hattori et al.

[11] 4,225,925
[45] Sep. 30, 1980

[54] ELECTRONIC IGNITION CONTROL METHOD AND APPARATUS

[75] Inventors: Tadashi Hattori, Okazaki; Mamoru Kobashi, Aichi; Tooru Kawase, Toyota; Yoshiki Ueno, Okazaki, all of Japan

[73] Assignees: Nippon Soken, Inc., Nishio; Toyota Jidosha Kogyo Kabushiki Kaisha, Toyota, both of Japan

[21] Appl. No.: 889,980

[22] Filed: Mar. 24, 1978

[30] Foreign Application Priority Data

Mar. 30, 1977 [JP] Japan .................................. 52-36317
Apr. 19, 1977 [JP] Japan .................................. 52-44712

[51] Int. Cl.$^2$ ........................ F02B 3/00; G06F 15/20
[52] U.S. Cl. .................................. 364/431; 123/478; 123/416; 364/569
[58] Field of Search .................. 364/424, 431, 422; 123/117 D, 117 R, 32 EB

[56] References Cited

U.S. PATENT DOCUMENTS

| | | | |
|---|---|---|---|
| 3,906,207 | 9/1975 | Rivere et al. | 364/424 |
| 3,969,614 | 7/1976 | Moyer et al. | 364/431 |
| 4,009,699 | 3/1977 | Hetzler et al. | 123/117 D |
| 4,036,190 | 7/1977 | Bigliani et al. | 123/117 D |
| 4,052,967 | 10/1977 | Colling et al. | 123/117 D |
| 4,063,539 | 12/1977 | Gorille et al. | 123/117 D |
| 4,099,495 | 7/1978 | Kiencke | 364/442 |

FOREIGN PATENT DOCUMENTS

2551639 6/1977 Fed. Rep. of Germany ........... 364/431

*Primary Examiner*—Felix D. Gruber
*Attorney, Agent, or Firm*—Cushman, Darby & Cushman

[57] ABSTRACT

To determine an optimum advance angle for activation of a spark plug in relation to an amount of air sucked into an engine, an electronic ignition control method and apparatus comprises a calculation circuit to calculate a linear equation representing a relationship between the optimum advance angle of activation of the spark plug and the amount of the sucked air in consideration with rotation speed of an output shaft of the engine, thereby to simplify the calculation.

12 Claims, 15 Drawing Figures

Fig. 7
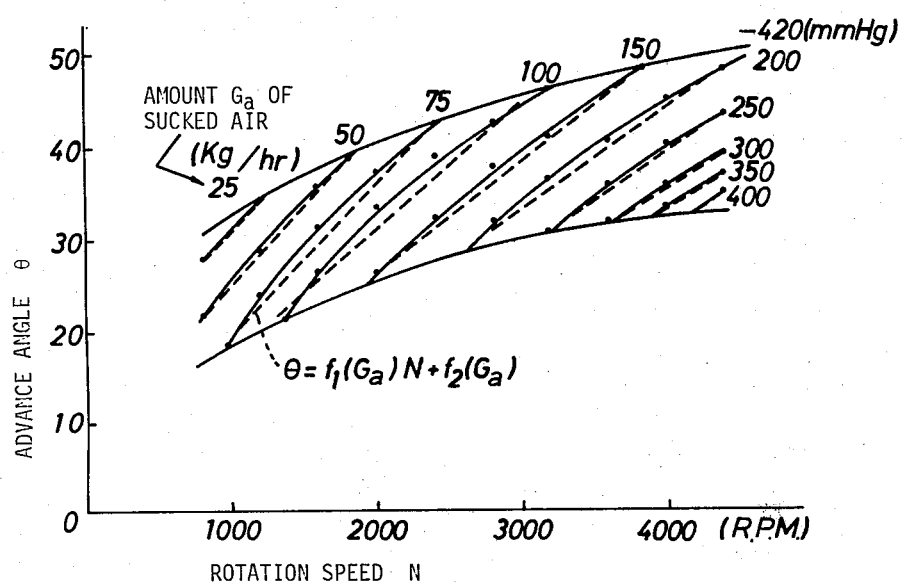
Fig. 8
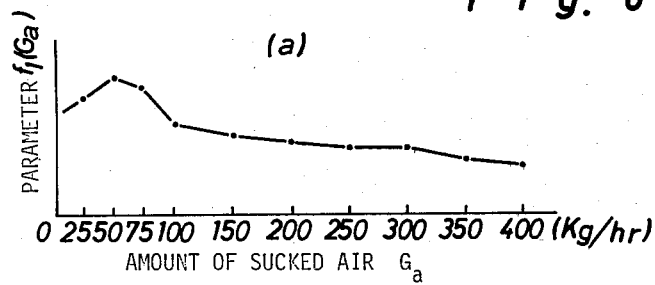
(a)
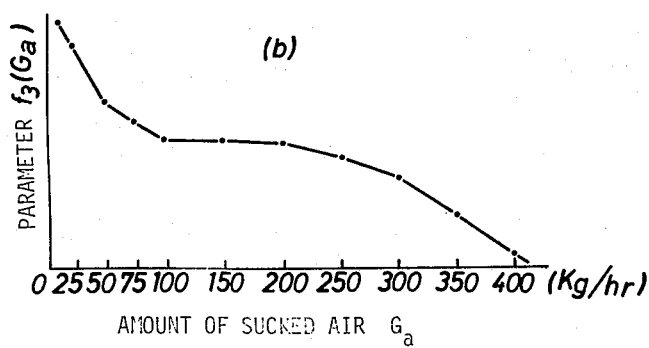
(b)

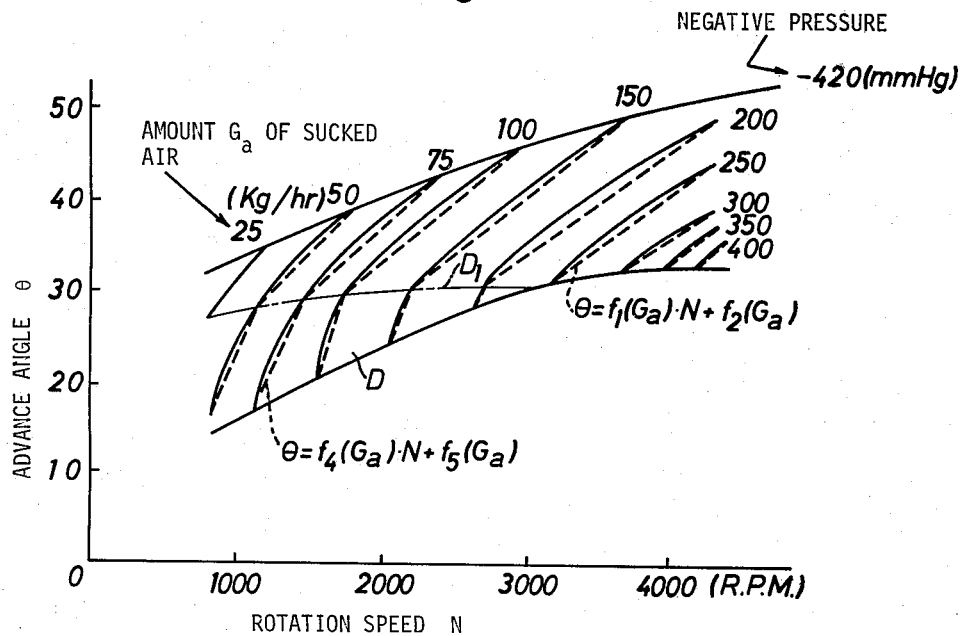
Fig. 12
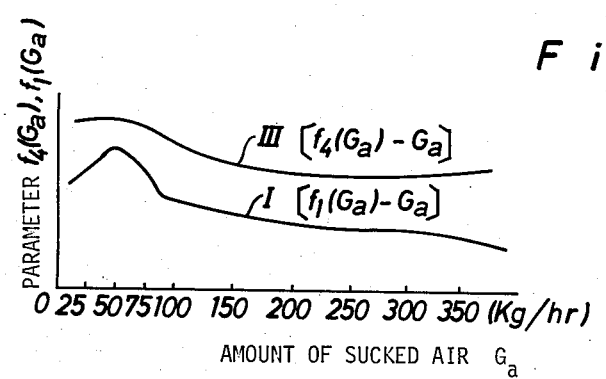
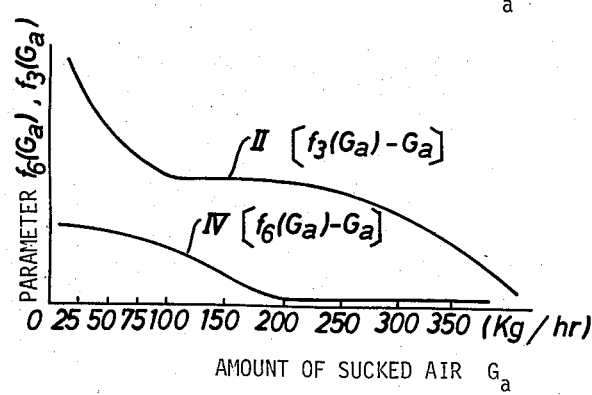
Fig. 13

ELECTRONIC IGNITION CONTROL METHOD AND APPARATUS

BACKGROUND OF THE INVENTION

The present invention relates to an electronic control method and apparatus for internal combustion engines, and more particularly to an electronic ignition control method and apparatus of the type in which a calculation circuit is provided to determine an optimum timing of sparks supplied to the engine in accordance with changes of operating condition of the engine.

SUMMARY OF THE INVENTION

The primary object of the present invention is to provide an electronic ignition control method and apparatus wherein to determine an optimum advance angle for activation of each spark plug in relation to an amount of air sucked into the engine. A calculation circuit is provided to calculate a linear equation representing a relationship between the optimum advance angle of activation of the spark plug and the amount of the sucked air in consideration with rotation speed of an output shaft of the engine, thereby to simplify the calculation.

According to the present invention, there is provided an electronic ignition control apparatus for an internal combustion engine having an output shaft rotated by a piston, an ignition coil adapted to generate a spark voltage upon deenergization of the primary winding thereof and a spark plug activated by the spark voltage to ignite the air-fuel mixture metered into a combustion chamber of the engine so as to operate the piston, the control apparatus comprising:

a first signal generator for producing a first signal at each rotation of the output shaft;

a second signal generator for producing a second binary signal indicative of rotation speed of the output shaft in response to the first signal;

a third signal generator for producing a third binary signal indicative of an amount of air sucked into the combustion chamber of the engine in response to the first signal;

first memory means for storing a first data indicating a first parameter in relation to the rotation speed of the output shaft to produce a fourth binary signal indicative of an optimum value of the first parameter in accordance with the second binary signal, the first parameter defining an ascent of a linear equation representing a relationship between an optimum advance angle for activation of the spark plug and the amount of the sucked air in consideration with the rotation speed of the output shaft;

second memory means for storing a second data indicating a second parameter in relation to the rotation speed of the output shaft to produce a fifth binary signal indicative of an optimum value of the second parameter in accordance with the second binary signal, the second parameter defining an ordinates' intersection of the linear equation in consideration with the rotation speed of the output shaft;

a calculation circuit for calculating the linear equation in accordance with the third, fourth and fifth binary signals to obtain the optimum advance angle in relation to the amount of air; and a timing signal generator for generating a timing signal in accordance with the optimum advance angle such that the primary winding of the ignition coil is deenergized in response to the timing signal.

In actual practice of the present invention, in the first stage of an experiment conducted by the inventors, a relationship between an optimum spark advance angle and an amount of air sucked into an engine in consideration with negative pressure in the air suction passage of the engine was obtained as shown by a plurality of characteristic curves in FIG. 1. At the second stage, based on the above-noted relationship, the inventors obtained the following equation representing a relationship between the optimum spark advance angle and the amount of the sucked air in consideration with rotation speed, as shown by a plurality of straight lines in FIG. 1.

$$\theta = -f_1(N) \cdot G_a + f_2(N) \tag{1}$$

where $\theta$ is the optimum spark advance angle and $G_a$ is the amount of the sucked air, and where $f_1(N)$ is a first parameter indicative of an ascent of the linear equation (1) and $f_2(N)$ is a second parameter indicative of an ordinates' intersection of the linear equation (1).

BRIEF DESCRIPTION OF THE DRAWINGS

Additional objects and advantages of the present invention will be more readily apparent from the following detailed description of preferred embodiments thereof when taken together with the accompanying drawings in which:

FIG. 7 depicts a graph indicative of an optimum spark advance angle $\theta$ in relation to rotation speed N;

FIG. 8 depicts graphs respectively indicative of a parameter in relation to an amount of the sucked air;

FIG. 12 depicts a graph indicative of an optimum spark advance angle $\theta$ in relation to rotation speed N in consideration with engine detonation;

FIG. 13 depicts graphs respectively indicative of a parameter in relation to an amount of the sucked air;

DESCRIPTION OF THE PREFERRED EMBODIMENTS

Figure 2:
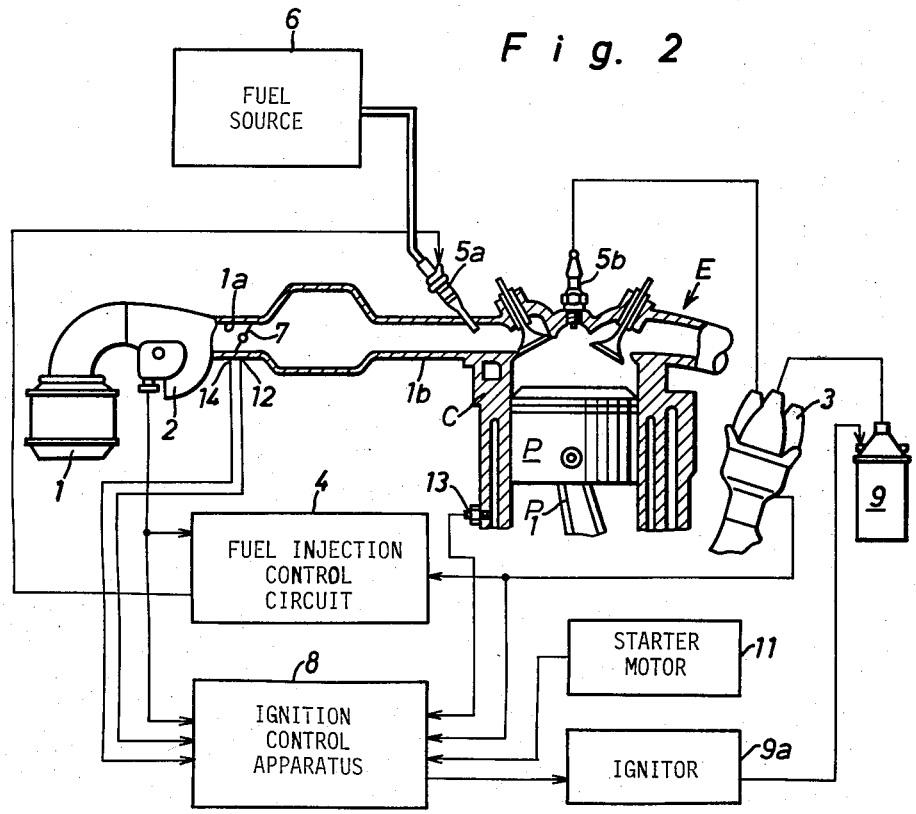
FIG. 2 is a schematic block diagram of an electronic control system for the engine including an electronic ignition control apparatus in accordance with the present invention.

Referring now to the accompanying drawings, in particular to FIG. 2 there is illustrated a schematic block diagram of an electronic control system for an internal combustion engine E including an electronic ignition control apparatus 8 in accordance with the present invention.

The engine E is of a conventional four cylinder, four stroke type and comprises a piston P reciprocable within each cylinder C. The piston P is connected by way of a connecting rod P₁ to a crankshaft (not shown) to produce rotation of the crankshaft in response to reciprocation thereof. The engine E also comprises four fuel injectors 5a mounted on an intake manifold 1b and four spark plugs 5b mounted on a cylinder head. Each fuel injector 5a is activated by receiving each electric signal from a fuel injection control circuit 4 to supply fuel from a fuel source 6 into the cylinder C. Each spark plug 5b is energized by a spark voltage from a distributor 3 to produce a spark for igniting air-fuel mixture within the cylinder C. The distributor 3 is provided to distribute the spark voltage from an ignition coil 9 to each spark plug 5b at appropriate intervals.

The electronic control system comprises an air flow meter 2 provided within an induction passage 1a and a signal generator 10 (see FIG. 3) provided within the distributor 3. The air flow meter 2 detects an amount of air sucked into the engine E from an air cleaner 1 through the induction passage 1a and a throttle valve 7 to produce an electric signal indicative of an amount of the sucked air. The signal generator 10 includes a reference signal generator for producing four reference signals a with a predetermined angular width $\theta_T°$ per two rotations of the crankshaft (See FIG. 4). The signal generator 10 also includes a speed signal generator for producing 720 angular signals b per two rotations of the crankshaft. Each reference signal a is generated upon the arrival of each piston C to its top dead center position, and each angular signal b is generated at a one-degree rotation of the crankshaft.

The electronic control system further comprises first and second throttle switches 12 and 14 provided with the throttle valve 7 and a crank switch (not shown) provided within a starter motor 11 operatively coupled with the crankshaft. The first throttle switch 12 closes only at the fully closed position of the throttle valve 7, and the second throttle switch 14 closes only at the fully opened position of the throttle valve 7. The crank switch is closed only under cranking operation of the engine E. A coolant temperature sensor 13 is provided in the engine cooling system to detect coolant temperature of the engine E. The fuel injection control circuit 4 receives electric signals from the air flow meter 2, the signal generator 10 and other sensors (not shown) to control the amount of fuel injected from the fuel injector 5a to an optimum value. The ignition control apparatus 8 receives the electric signals from the air flow meter 2 and the signal generator 10 to generate an optimal ignition timing signal under control by the throttle switches 12 and 14, the crank switch and the coolant temperature sensor 13. An ignitor 9a receives the ignition timing signal from the ignition control apparatus 8 to produce the spark voltage in the ignition coil 9.

Figure 3:
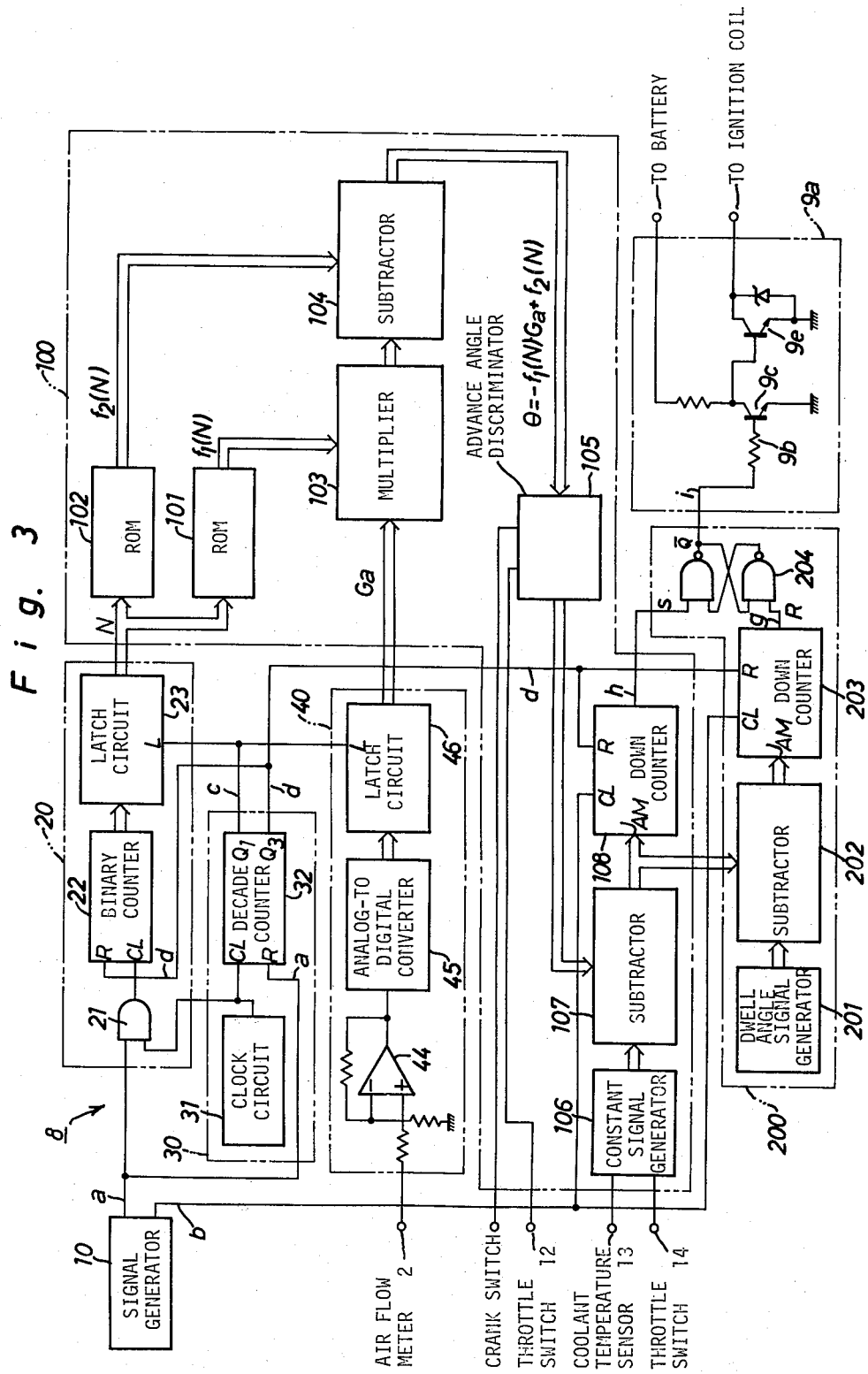
FIG. 3 is a circuit diagram of an embodiment of the ignition control apparatus illustrated in block form in FIG. 2.
Figure 4:
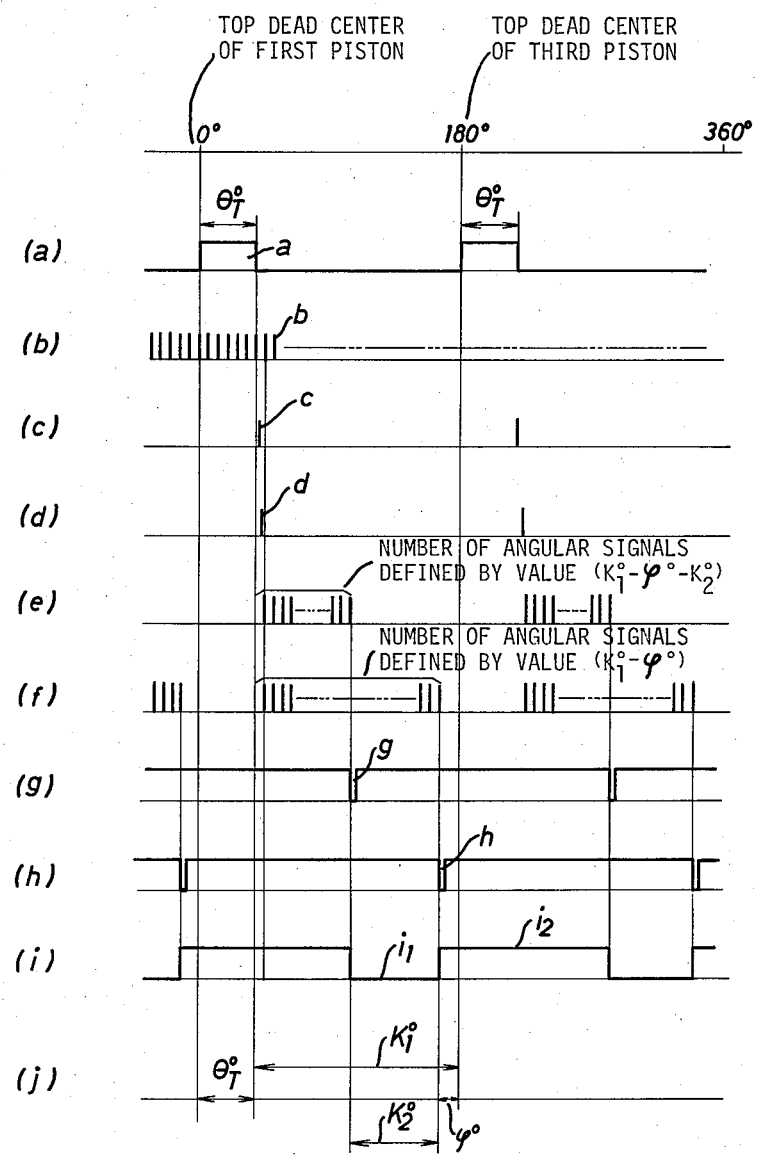
FIG. 4 illustrates waveforms obtained at various points in the ignition control apparatus of FIG. 3.

In FIG. 3, there is illustrated an embodiment of the ignition control apparatus 8 which is described hereinafter in detail. The ignition control apparatus 8 comprises a speed calculation circuit 20 driven by a timing circuit 30 in response to each reference signal a from the signal generator 10. The timing circuit 30 comprises a decade counter 32 which is reset by each reference signal a. The counter 32 counts clock pulses from a clock circuit 31 immediately after release of the reset condition thereof to generate at its output terminals Q₁ and Q₃ latch and reset signals c and d shown in FIG. 4. The latch and reset signals c and d appear sequentially within a period of time of the angular signal b immediately after the waveform of each reference signal a drops at its trailing edge.

The speed calculation circuit 20 includes a binary counter 22 for counting output pulses from an AND gate 21. AND gate 21 receives clock pulses from the clock circuit 31 in response to each reference signal a to generate therefrom the output pulses defined by the predetermined angular width $\theta_T°$ of each reference signal a. The binary counter 22 is reset upon receiving each reset signal d from the decade counter 32 to count the output pulses from AND gate 21 in response to a reference signal a following each reset signal d. Then, the counter 22 generates a binary electric signal defined by the predetermined angular width $\theta_T°$ after completion of its count. In other words, the counter 22 generates the binary electric signal indicative of an instant rotation speed N at a half crankshaft rotation. A latch circuit 23 is provided to latch the binary electric signal from the counter 22 in response to each latch signal c.

In operation of the speed calculation circuit 20 relative to the timing circuit 30, assuming that the signal generator 10 generates a reference signal a therefrom, the reference signal a is applied to AND gate 21 and the decade counter 32. When AND gate 21 receives clock pulses from the clock circuit 31 in response to the reference signal a, output pulses are generated from AND gate 21 and applied to the terminal CL of the counter 22. Simultaneously, the counter 32 is reset by the reference signal a to count clock pulses from the clock circuit 31 immediately after release of the reset condition thereof so as to sequentially generate latch and reset signals c and d therefrom. The latch signal c is applied to the latch circuit 23, and the reset signal d is applied to the counter 22. Then, a binary signal, which is previously produced from the counter 22 in response to a reset signal d prior to the above latch signal c, is latched and transferred by the latch circuit 23 to a first calculation circuit 100. Subsequently, the counter 22 is reset by the reset signal d to count the output pulses from AND gate 21 so as to generate another binary signal therefrom upon completion of its count.

The ignition control apparatus 8 further comprises a conversion circuit 40 for converting the electric signal from the air flow meter 2 into a binary electric signal indicative of an amount $G_a$ of the sucked air. The conversion circuit 40 includes a differential amplifier 44 for amplifying the electric signal from the air flow meter 2 and an analog-to-digital converter 45 for converting an output signal from the amplifier 44 into the binary electric signal indicative of an amount $G_a$ of the sucked air. In the conversion circuit 40, a latch circuit 46 is provided to latch and transfer the binary electric signal from the converter 45 to the first calculation circuit 100 in response to each latch signal c from the decade counter 32.

Figure 1:
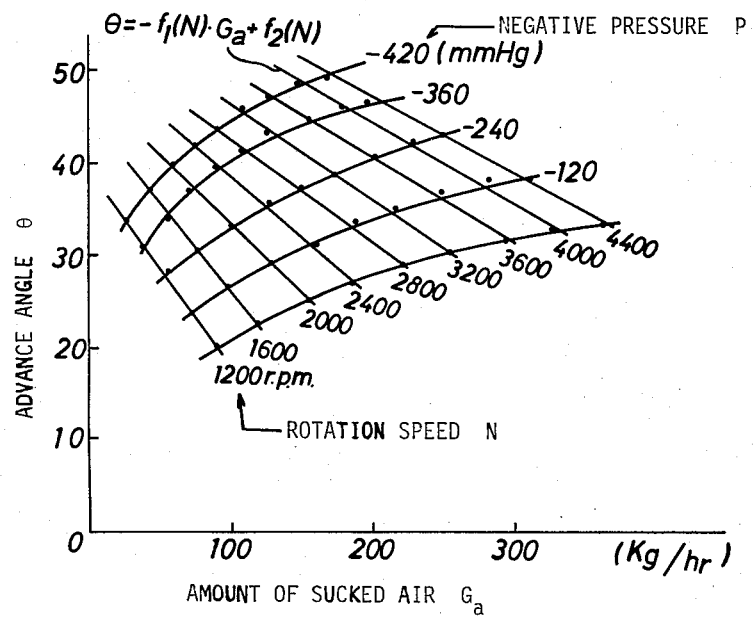
FIG. 1 depicts a graph indicative of an optimum spark advance angle $\theta$ in relation to an amount $G_a$ of air sucked into an internal combustion engine.
Figure 5:
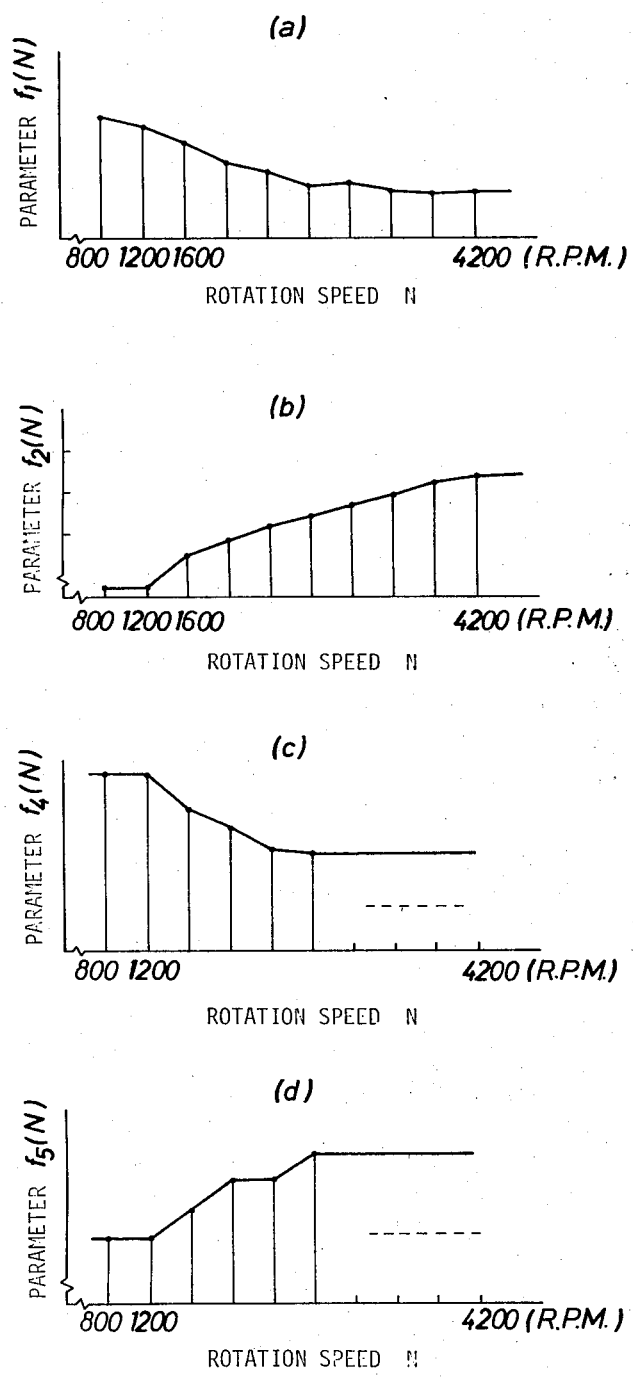
FIG. 5 depicts graphs respectively indicative of a parameter in relation to rotation speed.

The first calculation circuit 100 comprises a pair of read only memories of ROMs 101 and 102 for receiving the binary electric signal indicative of an instant rotation speed N from the latch circuit 23. ROM 101 previously stores therein data indicating the parameter $f_1(N)$ in relation to the rotation speed N shown in (a) of FIG. 5, and ROM 102 previously stores therein other data indicating the parameter $f_2(N)$ in relation to the rotation speed N shown in (b) of FIG. 5. These data are approximately obtained from the characteristic curve of FIG. 1. Thus, in ROM 101, an instant value of $f_1(N)$ is read out as a binary signal in relation to the instant rotation speed N defined by the binary electric signal from the latch circuit 23 by using the stored data. Meanwhile, in ROM 102, an instant value of $f_2(N)$ is also read out as a binary signal in relation to the instant rotation speed N by using the stored other data.

The first calculation circuit 100 further comprises a multiplier 103 for receiving the binary signal indicative of the instant value of $f_1(N)$ from ROM 101 and the binary signal indicative of the instant amount $G_a$ of the sucked air from the latch circuit 46. In the multiplier 103, the instant value of $f_1(N)$ is multiplied by the instant amount $G_a$ of the sucked air, and an multiplied value $f_1(N) \cdot G_a$ is applied as a binary signal to a subtractor 104. The subtractor 104 subtracts the multiplied value $f_1(N) \cdot G_a$ from the instant value of $f_2(N)$ defined by the binary signal read out in ROM 102. The subtracted resultant value $\theta°$ or $\{-f_1(N) \cdot G_a + f_2(N)\}$ is applied as a binary signal to an advance angle discriminator 105.

The discriminator 105 is designed to transfer a binary signal indicative of the subtracted resultant value $\theta°$ to a subtractor 107 only when the crank switch and the first throttle switch 12 are opened. When the crank switch and the first throttle switch 12 are closed under cranking of the engine E, the discriminator 105 generates a binary signal indicative of a first predetermined advance angle $\theta_1°$ therefrom. When the crank switch is opened and the first throttle switch 12 is closed during idle operation of the engine E, the discriminator 105 generates a binary signal indicative of a second predetermined advance angle $\theta_2°$. The advance angles $\theta_1°$ and $\theta_2°$ are experimentally determined to ensure an optimum ignition timing of the engine E under cranking and idling operations respectively.

When one of the binary signals respectively indicative of the advance angles $\theta_1°$, $\theta_2°$ and $\theta°$ is transferred to the subtractor 107 from the discriminator 105, the advance angle $\phi°$ is subtracted from a constant $K_1°$ (See FIG. 4) defined by a binary signal from a constant signal generator 106, the character $\phi°$ representing the character $\theta_1°$, $\theta_2°$ or $\theta°$. The constant signal generator 106 produces the binary signal indicative of the constant $K_1°$ in accordance with operating conditions of the engine E under control by the coolant temperature sensor 13 and the second throttle switch 14. In this case, the constant $K_1°$ corresponds to a difference between 180° and $\theta_T°$ defined by the reference signal a. A down counter 108 is provided to receive the angular signals b from the signal generator 10 and a binary signal indicative of the subtracted value $(K_1° - \phi°)$ from the subtractor 107. The down counter 108 is reset upon receiving a reset signal d from the decade counter 32 to set therein the subtracted value defined by the binary signal of the subtractor 107. Then, the subtracted value is counted down by the counter 108 to zero in accordance with the angular signals b from the signal generator 10. Thus, the counter 108 generates an output signal h therefrom upon completion of the count. The output signal h is applied to a flip-flop 204 of a second calculation circuit 200.

The second calculation circuit 200 comprises a dwell angle signal generator 201 for generating a binary signal indicative of a predetermined dwell angle $K_2°$ (See FIG. 4) and a subtractor 202 for receiving the binary signals from the signal generator 201 and the subtractor 107. In the subtractor 202, the predetermined dwell angle $K_2°$ is subtracted from the value $(K_1° - \phi°)$ defined by the binary signal of the subtractor 107. A down counter 203 is provided to receive a binary signal indicative of a subtracted value $(K_1° - \phi° - K_2°)$ from the subtractor 202 and the angular signals b from the signal generator 10. The down counter 203 is reset upon receiving a reset signal d from the counter 32 to set therein the subtracted value defined by the binary signal of the subtractor 202. Then, the subtracted value is counted down by the counter 203 to zero in accordance with the angular signals b from the signal generator 10. Thus, the counter 203 generates therefrom an output signal g upon completion of the count.

The flip-flop 204 receives at its input terminal R the output signal g from the down counter 203 to generate a low level signal $i_1$ at its output terminal $\overline{Q}$, the low level signal $i_1$ having a width corresponding with the predetermined dwell angle $K_2°$. When the low level signal $i_1$ from the flip-flop 204 is applied to a transistor 9c of the ignitor 9a, the transistor 9c is turned off to cause conduction of a transistor 9e. Then, a low level signal appears from the transistor 9e and energizes the ignition coil 9 at the dwell angle $K_2°$. When the flip-flop 204 receives at its input terminal S the output signal h from the counter 108, it generates at its output terminal $\overline{Q}$ a high level signal $i_2$ which is applied to the transistor 9c as an ignition timing signal. Then, the transistor 9c is turned on to cause non-conduction of the transistor 9e. Thus, a high level signal appears from the transistor 9e and deenergizes the ignition coil 9 at its leading edge.

Hereinafter, the operation of the ignition control apparatus 8 will be described in detail under various operating conditions of the engine E. Under cranking of the engine E, assuming that a reference signal a from the signal generator 10 is applied to AND gate 21 and the decade counter 32 and that angular signals b from the signal generator 10 are applied to the down counters 108 and 203, AND gate 21 receives clock pulses from the clock circuit 31 in response to the reference signal a to generate output pulses therefrom. Then, the output pulses from AND gate 21 are applied to the binary counter 22. Simultaneously, the counter 32 is reset by the reference signal a to count clock pulses from the clock circuit 31 and sequentially generates therefrom latch and reset signals c and d. The latch signal c is applied to the latch circuits 23 and 46, while the reset signal d is applied to the binary counter 22 and the down counters 108 and 203. Then, a binary signal, which is previously produced in the counter 22 in response to a reset signal d prior to the latch signal c, is latched and transferred by the latch circuit 23 to ROMs 101 and 102 in response to the latch signal c. When instant values of $f_1(N)$ and $f_2(N)$ are respectively read out by ROMs 101 and 102 in relation to an instant rotation speed N defined by the binary signal from the latch circuit 23, binary signals indicative of the values of $f_1(N)$ and $f_2(N)$ are respectively applied to the multiplier 103 and the subtractor 104.

Meanwhile, an electric signal from the air flow meter 2 is amplified by the amplifier 44 and converted by the converter 45 into a binary signal indicative of an amount $G_a$ of the sucked air. Then, the binary signal from the converter 45 is latched and transferred by the latch circuit 46 to the multiplier 103 in response to the latch signal c. When the multiplier 103 receives the binary signals from ROM 101 and the latch circuit 46 as described above, the value of $f_1(N)$ is multiplied by the amount $G_a$ of the sucked air and, thereafter, a binary signal indicative of a multiplied value $f_1(N) \cdot G_a$ is applied 107 from a constant $K_1°$ defined by a binary signal from the constant signal generator 106 and, thereafter, a subtracted value $(K_1° - \theta_2°)$ is applied as a binary signal to the down counter 108 and the subtractor 202.

After the value $(K_1° - \theta_2°)$ is subtracted in the subtractor 202 from the predetermined dwell angle $K_2°$ defined by a binary signal from the dwell angle signal generator 201, a binary signal indicative of a subtracted value $(K_1° - \theta_2° - K_2°)$ is applied by the subtractor 202 to the down counter 203. When the down counter 203 is reset by a reset signal d from the counter 32, the value signal d at each half crankshaft rotation by using the value $\theta°$ or $\{-f_1(N)\cdot G_a+f_2(N)\}$ from the discriminator 105.

Figure 6:
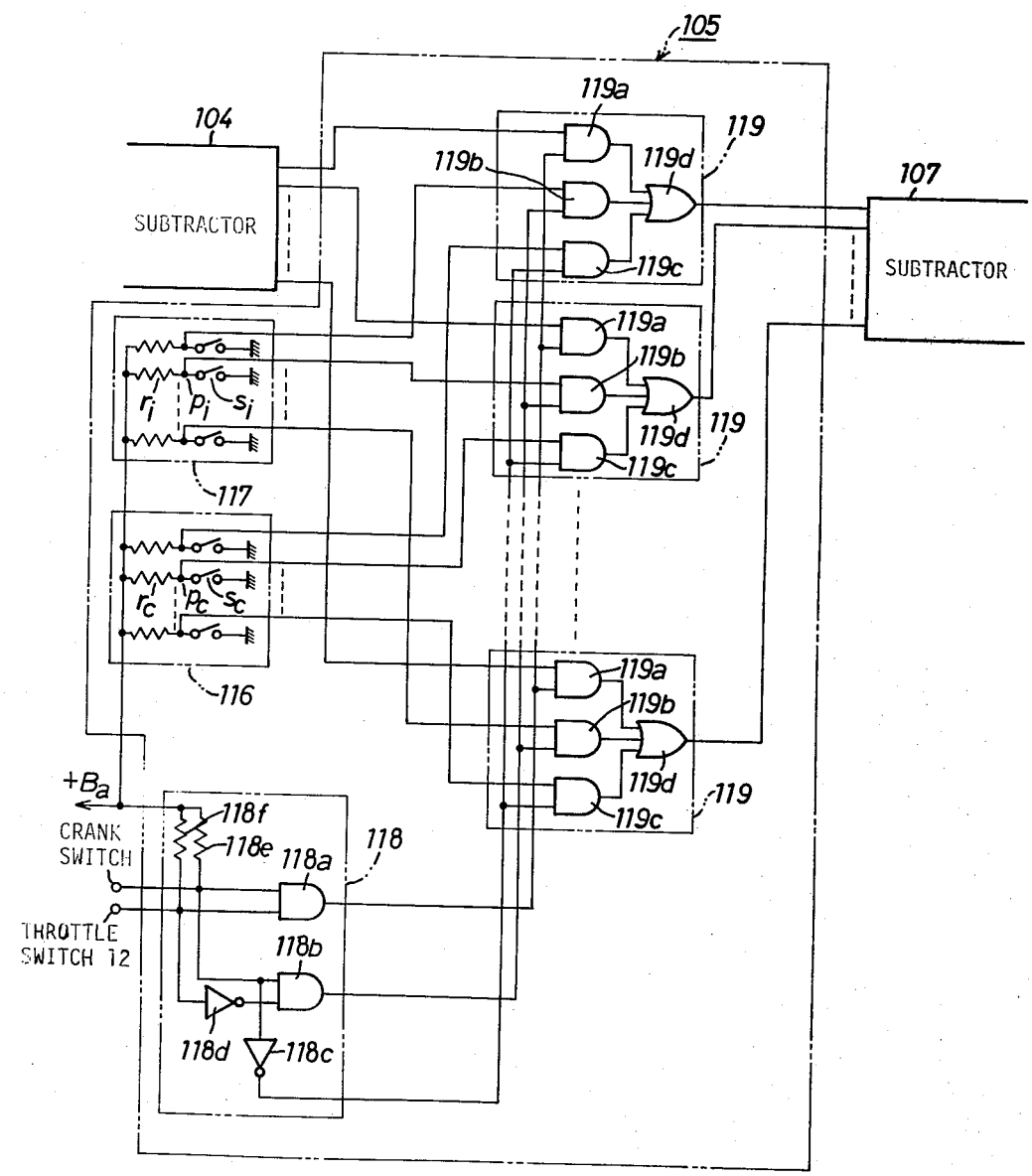
FIG. 6 is a circuit diagram of an embodiment of the spark advance angle discriminator illustrated in block form in FIG. 3.

In FIG. 6, there is illustrated an embodiment of the discriminator 105 which comprises a plurality of selector circuits 119 for selecting one of the binary signals from the subtractor 104 and first and second advance angle signal generators 116 and 117 in response to binary signals from a logic circuit 118. The logic circuit 118 includes an AND gate 118a for generating a low level signal therefrom when at least one of the crank switch and the first throttle switch 12 is closed. In this case, AND gate 118a grounded at its input terminal through the crank switch or the first throttle switch 12. When the crank switch and the throttle switch 12 are opened, AND gate 118a receives an electric voltage from a battery $B_a$ through resistors 118e and 118f to generate a high level signal therefrom. The logic circuit 118 further includes an AND gate 118b for generating a low level signal therefrom when the crank switch and the throttle switch 12 are opened. When the crank switch is closed under opening the throttle switch 12, AND gate 118b also generates a low level signal therefrom due to function of an inverter 118d. When the crank switch is opened and the throttle switch 12 is closed, the voltage from the battery $B_a$ is applied to the first input terminal of AND gate 118b through the resistor 118e. Simultaneously, the voltage from the battery $B_a$ is inverted by the inverter 118d into a low level signal which is applied to the second input terminal of AND gate 118b. Then, AND gate 118b generates a high level signal therefrom. An inverter 118c is provided to generate a low level signal when the crank switch is opened. When the crank switch is closed, the inverter 118c generates a high level signal therefrom.

The first advance angle signal generator 116 comprises a plurality of series circuits respectively composed of a switch $S_c$ and a resistor $r_c$. These series circuits are connected in parallel to each other between the battery $B_a$ and the ground. Each series circuit receives the electric voltage from the battery $B_a$ upon opening the switch $S_c$ to generate a high level signal at a junction $P_c$. When each switch $S_c$ is closed, each series circuit is grounded to generate a low level signal at the junction $P_c$. In the generator 116, a first predetermined advance angle $\theta_1°$ necessary for cranking operation of the engine E is previously set by opening and closing each switch $S_c$.

The second advance angle signal generator 117 comprises a plurality of series circuits respectively composed of a switch $S_i$ and a resistor $r_i$. These series circuits are connected in parallel to each other between the battery $B_a$ and the ground. Each series circuit receives the electric voltage from the battery $B_a$ upon opening the switch $S_i$ to generate a high level signal at a junction $P_i$. When each switch $S_c$ is closed, each series circuit is grounded to generate a low level signal at the junction $P_i$. In the generator 117, a second advance angle $\theta_2°$ necessary for idle operation of the engine E is previously set by opening and closing each switch $S_i$.

Each selector circuit 119 comprises three AND gates 119a to 119c and an OR gate 119d. Each AND gate 119a transfers the binary signal from the subtractor 104 to the subtractor 107 through each OR gate 119d only when AND gate 118a generates the high level signal. Only when AND gate 118b generates the high level signal, each AND gate 119b applies the high or low level signal from each series circuit of the signal generator 117 to the subtractor 107 through each OR gate 119d. Further, each AND gate 119c applies the high or low level signal from each series circuit of the signal generator 116 to the subtractor 107 through each OR gate 119d only when the inverter 118c generates the high level signal.

In operation of the discriminator 105, when the crank switch and the first throttle switch 12 are opened, a high level signal appears from AND gate 118a and low level signals appear from AND gate 118b and the inverter 118c respectively. Then, the binary signal from the subtractor 104 is transferred by each AND gate 119a to each OR gate 119d in response to the high level signal from AND gate 118a and, in turn, transferred by each OR gate 119d to the subtractor 107. In this state, the binary signals from the signal generators 116 and 117 are blocked by each AND gate 119b and 119c in response to the low level signals from AND gate 118b and the inverter 118c.

When the crank switch and the throttle switch 12 are closed, low level signals appear from AND gates 118a and 118b and a high level signal appears from the inverter 118c. Then, only the binary signal from the signal generator 116 is applied by each AND gate 119c to each OR gate 119d in response to the high level signal from the inverter 118c and, in turn, applied to the subtractor 107.

When the crank switch is opened under closing of the throttle switch 12, low level signals appear from AND gate 118a and the inverter 118c and a high level signal appears from AND gate 118b. Then, only the binary signal from the signal generator 117 is applied by each AND gate 119b to each OR gate 119d in response to the high level signal from AND gate 118b and, in turn, applied by each OR gate 119d to the subtractor 107.

Figure 9:
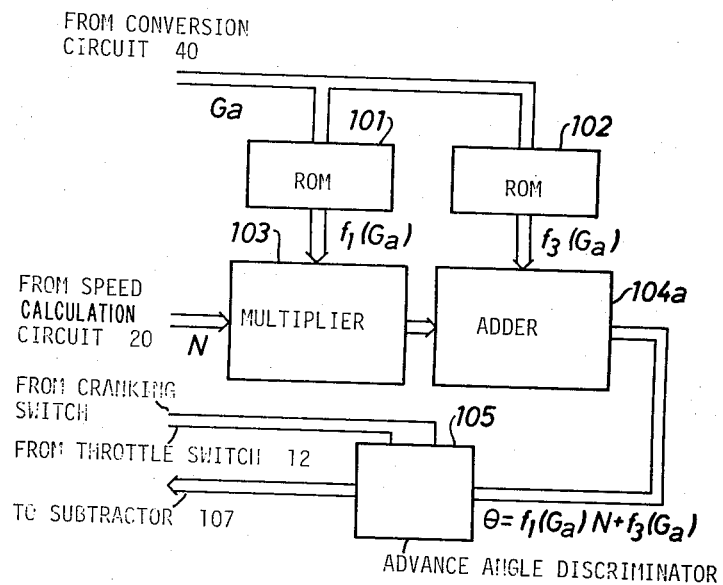
FIG. 9 illustrates a modified portion of the circuit diagram of the ignition control apparatus shown in FIG. 3.

In FIG. 9, there is illustrated a modification of the first calculation circuit 100 which is described hereinafter in detail. In the modification, ROMs 101 and 102 are connected to the conversion circuit 40 and the multiplier 103 is connected to the speed calculation circuit 20. Further, an adder 104a is disposed among ROM 102, the multiplier 103 and the discriminator 105. ROM 101 is provided to previously store therein data indicating a parameter $f_1(G_a)$ in relation to the amount $G_a$ of the sucked air shown in (a) of FIG. 8 in replacement of the data in (a) of FIG. 5. ROM 102 is provided to previously store therein data indicating a parameter $f_3(G_a)$ in relation to the amount $G_a$ of the sucked air shown in (b) of FIG. 8 in replacement of the data in (b) of FIG. 5. These data are respectively obtained from a linear equation $\theta=f_1(G_a)\cdot N+f_2(G_a)$ shown by dotted lines of FIG. 7 in which the advance angle $\theta°$ is plotted in relation to the rotation speed N by utilizing the characteristic curve in FIG. 1. In this case, the parameter $f_3(Ga)$ is selected to satisfy the following relationship for compensation of a negative value of $f_2(G_a)$.

$$f_3(G_a)=f_2(G_a)+a \tag{2}$$

where a is a constant. Thus, in ROM 101, an instant value of $f_1(G_a)$ is read out as a binary signal in relation to the amount $G_a$ of the sucked air defined by the binary signal from the conversion circuit 40 by using the stored data. Meanwhile, in ROM 102, an instant value of $f_3(G_a)$ is read out as a binary signal in relation to the amount $G_a$ of the sucked air by using the stored data. The multiplier 103 receives the binary signal indicative of the value of $f_1(G_a)$ from ROM 101 and the binary signal indicative of the rotation speed N from the speed calculation circuit 20. In the multiplier 103, the value of $f_1(G_a)$ is multiplied by the rotation speed N, and a multiplied value $f_1(G_a) \cdot N$ is applied as a binary signal to the adder 104a. The value $f_1(G_a) \cdot N$ defined by the binary signal of the multiplier 103 is added in the adder 104a to the value of $f_3(G_a)$ defined by a binary signal read out in ROM 102, and an added value $\theta°$ or $\{f_1(G_a) \cdot N + f_3(G_a)\}$ is applied as a binary signal to the advance angle discriminator 105.

In this modification, to compensate the abovenoted constant a, the discriminator 105 generates binary electric signals respectively indicative of predetermined advance angles $(\theta_1° + a)$ and $(\theta_2° + a)$ in replacement of the first and second predetermined advance angles $\theta_1°$ and $\theta_2°$ previously described, and the constant signal generator 106 generates a binary signal indicative of a predetermined advance angle $(K_1° + a)$ in replacement of the predetermined advance angle $K_1°$ previously described. When a binary signal indicative of an added value $\{f_1(G_a) \cdot N + f_3(G_a)\}$ is applied to the discriminator 105 from the adder 104a, it is transferred to the subtractor 107 under openings of the crank switch and the first throttle switch 12. Then, the added value $\{K_1 - f_1(G_a) \cdot N - f_2(G_a)\}$ is subtracted by the subtractor 107 from the predetermined advance angle $(K_1° + a)$ defined by a binary signal from the constant signal generator 106 and a subtracted value $\{f_1(G_a) \cdot N + f_3(G_a)\}$ is applied to the down counter 108 and the subtractor 202. When the crank switch and the first throttle switch 12 are closed under cranking of the engine E, a binary signal indicative of the predetermined advance angle $(\theta_1° + a)$ is applied to the subtractor 107 from the discriminator 105. Then, the advance angle $(\theta_1° + a)$ is subtracted by the subtractor 107 from the predetermined advance angle $(K_1° + a)$ defined by a binary signal from the generator 106 and a subtracted value $(K_1° - \theta_1°)$ is applied as a binary signal to the down counter 108 and the subtractor 202. When the crank switch is opened and the first throttle switch 12 is closed during idle operation of the engine E, a binary signal indicative of the predetermined advance angle $(\theta_2° + a)$ is applied to the subtractor 107 from the discriminator 105. Then, the advance angle $(\theta_2° + a)$ is subtracted by the subtractor 107 from the predetermined angle $(K_1° + a)$ and a subtracted value $(K_1° - \theta_2°)$ is applied as a binary signal to the down counter 108 and the subtractor 202.

Figure 10:
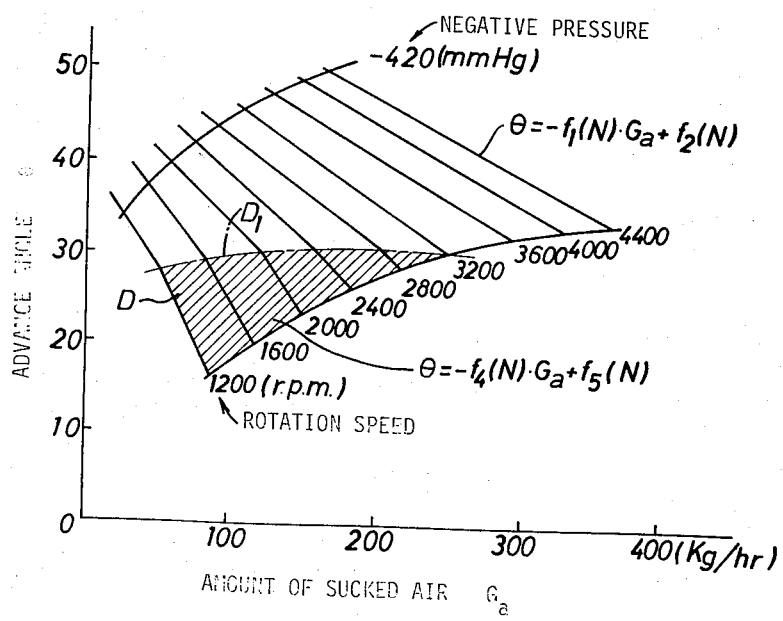
FIG. 10 depicts a graph indicative of an optimum spark advance angle $\theta$ in relation to an amount $G_a$ of the sucked air in consideration with engine detonation.

FIG. 10 illustrates another relationship between an optimum advance angle $\theta°$ and amount $G_a$ of the sucked air to prevent detonation which will be created within the engine E in an operating area D. In the area D, a following linear equation (3) is adopted in relation to the previously described linear equation (1).

$$\theta = -f_4(N) \cdot G_a + f_5(N) \quad (3)$$

The linear equation (3) intersects with the equation (1) at a borderline $D_1$ in FIG. 10, the parameters $f_4(N)$ and $f_5(N)$ being respectively larger than the parameters $f_1(N)$ and $f_2(N)$. This means that in the operating area D of FIG. 10, the advance angle defined by the equation (3) is smaller than the advance angle defined by the equation (1), in other words, ignition timing defined by the former advance angle delays with a predetermined angle in relation to ignition timing defined by the latter advance angle to prevent creation of engine detonation.

Figure 11:
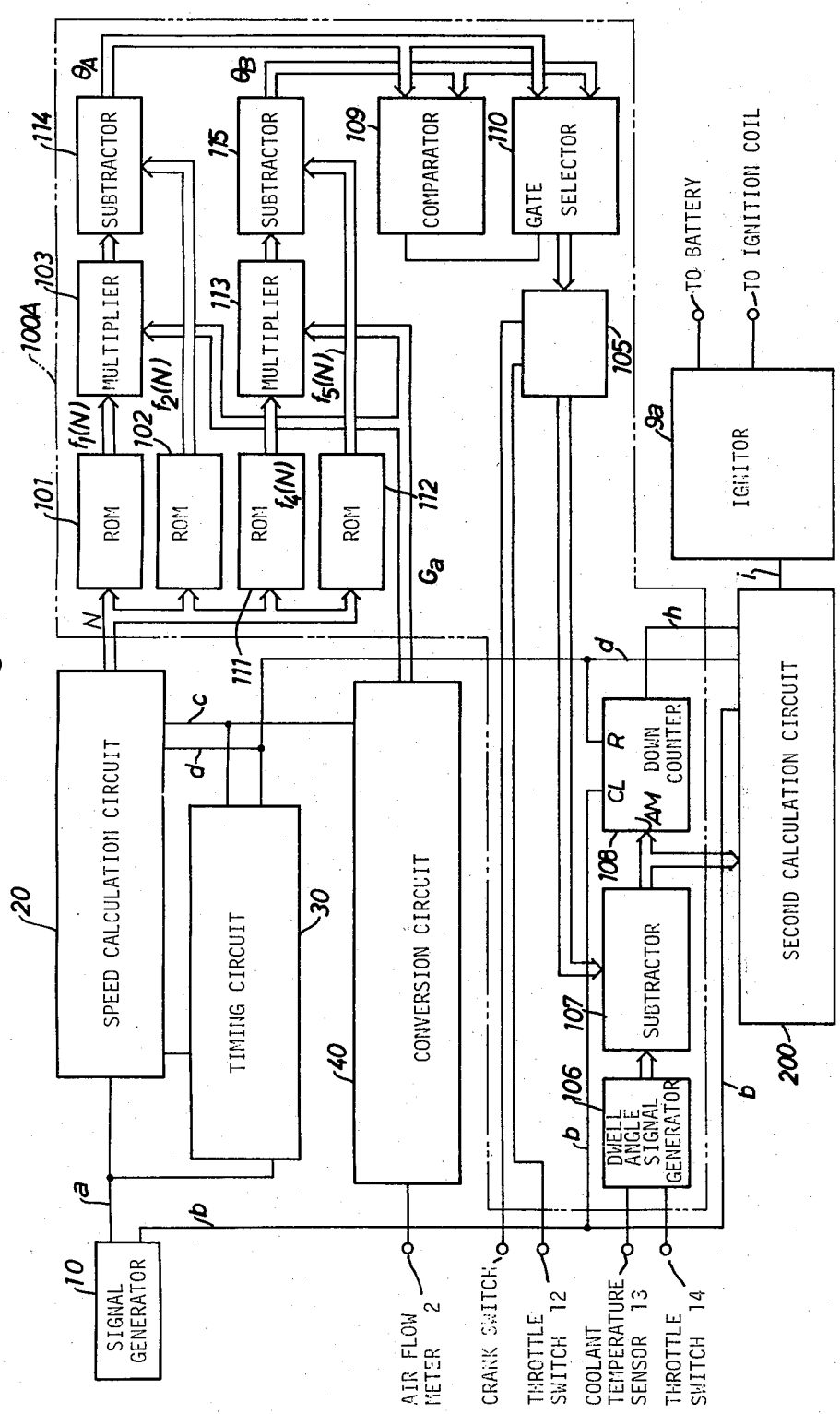
FIG. 11 is a circuit diagram of another embodiment of the ignition control apparatus illustrated in block form in FIG. 2.

In FIG. 11, there is another embodiment of the present invention which is characterized by provision of another first calculation circuit 100A in replacement of the first calculation circuit 100 previously described. The first calculation circuit 100A comprises the pair of ROMs 101 and 102 for receiving the binary electric signal indicative of an instant rotation speed N from the speed calculation circuit 20. ROMs 101 and 102 are provided to previously store the respective data indicating the parameters $f_1(N)$ and $f_2(N)$ in relation to the rotation speed N in (a) and (b) of FIG. 5, as previously described. The first calculation circuit 100A further comprises a pair of ROMs 111 and 112 for receiving the binary signal from the speed calculation circuit 20. ROM 111 stores therein data indicating the parameter $f_4(N)$ in relation to the rotation speed N shown in (c) of FIG. 5, and ROM 112 stores therein data indicating the parameter $f_5(N)$ in relation to the rotation speed N shown in (d) of FIG. 5. These data are respectively obtained from the linear equation (3) in FIG. 10. Thus, in ROM 111, an instant value of $f_4(N)$ is read out as a binary signal in relation to the instant rotation speed N defined by the binary signal from the speed calculation circuit 20. Meanwhile, in ROM 112, an instant value of $f_5(N)$ is also read out as a binary signal in relation to the rotation speed N.

The multiplier 103, which is previously described in the above embodiment, receives the binary signals respectively indicative of the value of $f_1(N)$ and the amount $G_a$ of the sucked air from ROM 101 and the conversion circuit 40. In the multiplier 103, the value of $f_1(N)$ is multiplied by the amount $G_a$ of the sucked air, and the multiplied value $f_1(N) \cdot G_a$ is applied as a binary signal to a subtractor 114. In the calculation circuit 100A, another multiplier 113 is provided to receive the binary signals respectively indicative of the value of $f_4(N)$ and the amount $G_a$ of the sucked air from ROM 111 and the conversion circuit 40. The value of $f_4(N)$ is multiplied in the multiplier 113 by the amount $G_a$ of the sucked air, and a multiplied value $f_4(N) \cdot G_a$ is applied as a binary signal to another subtractor 115. The subtractor 114 subtracts the multiplied value $f_1(N) \cdot G_a$ from the value of $f_2(N)$ defined by the binary signal from ROM 102, and another subtractor 115 subtracts the multiplied value $f_4(N) \cdot G_a$ from the value of $f_5(N)$ defined by the binary signal from ROM 112. A subtracted value $\theta_A°$ or $\{-f_1(N) \cdot G_a + f_2(N)\}$ in the subtractor 114 is applied as a binary signal to a comparator 109 and a selector 110, and a subtracted value $\theta_B°$ or $\{-f_4(N) \cdot G_a + f_5(N)\}$ in the subtractor 115 is also applied as a binary signal to the comparator 109 and the selector 110. The comparator 109 generates a high level signal therefrom when the value $\theta_A°$ is equal to or larger than the value $\theta_B°$. The comparator 109 also generates a low level signal therefrom when the value $\theta_A°$ is smaller than the value $\theta_B°$. The selector 110 functions to select and apply the binary signal from the subtractor 115 to the discriminator 105 in response to the high level signal from the comparator 109. The selector 110 also functions to select and apply the binary signal from the subtractor 114 to the discriminator 105 in response to the low level signal from the comparator 109.

In operation, during travel of the vehicle, the crank switch and the first throttle switch 12 are respectively opened. Under this state, assuming that a reference signal a from the signal generator 10 is applied to the speed calculation circuit 20 and the timing circuit 30 and that angular signals b from the signal generator 10 are applied to the down counter 108 of the first calculation circuit 100A and the second calculation circuit 200, the timing circuit 30 sequentially generates therefrom latch and reset signals c and d in response to the reference signal a, as previously described. Then, a binary signal, which is previously produced in the speed calculation circuit 20 in response to a reset signal d prior to the latch signal c, is transferred to ROMs 101, 102, 111 and 112 in respone to the latch signal c. When instant values of $f_1(N)$, $f_2(N)$, $f_4(N)$ and $f_5(N)$ are respectively read out by ROMs 101, 102, 111 and 112 in relation to an instant rotation speed N defined by the binary signal from the speed calculation circuit 20, binary signals indicative of the values of $f_1(N)$ and $f_4(N)$ are respectively applied to the multipliers 103 and 113 and binary signals indicative of the values of $f_2(N)$ and $f_5(N)$ are respectively applied to the subtractors 114 and 115. Meanwhile, an electric signal from the air flow meter 2 is converted by the conversion circuit 40 into a binary signal indicative of an amount $G_a$ of the sucked air which is transferred to the multipliers 103 and 113 in response to the latch signal c.

When the multiplier 103 receives the binary signals from ROM 101 and the conversion circuit 40 as described above, the value of $f_1(N)$ is multiplied by the amount $G_a$ of the sucked air and thereafter, a binary signal indicative of a multiplied value $f_1(N) \cdot G_a$ is applied to the subtractor 114. Simultaneously, the multiplier 113 receives the binary signals from ROM 111 and the conversion circuit 40 as described above and the value of $f_4(N)$ is multiplied by the amount $G_a$ of the sucked air and thereafter, a binary signal indicative of a multiplied value $f_4(N) \cdot G_a$ is applied to the subtractor 115. Then, the value $f_1(N) \cdot G_a$ is subtracted by the subtractor 114 from the value of $f_2(N)$ defined by the binary signal from ROM 102 and a subtracted value $\theta_A°$ or $\{-f_1(N) \cdot G_a + f_2(N)\}$ is applied as a binary signal to the comparator 109 and the selector 110. At the same time, the value $f_4(N) \cdot G_a$ is subtracted by the subtractor 115 from the value of $f_5(N)$ defined by the binary signal from ROM 112 and a subtracted value $\theta_B°$ or $\{-f_4(N) \cdot G_a + f_5(N)\}$ is applied as a binary signal to the comparator 109 and the selector 110.

When the value $\theta_A°$ is equal to or larger than the value $\theta_B°$, the comparator 109 generates a high level signal which is applied to a gate terminal of the selector 110. Then, the value $\theta_B°$ is selected and applied by the selector 110 as a binary signal to the discriminator 105 in respone to the high level signal from the comparator 109. When the discriminator 105 applies the binary signal indicative of the value $\theta_B°$ under openings of the crank switch and the first throttle switch 12 to the subtractor 107, the value $\theta_B°$ is subtracted in the subtractor 107 from a constant $K_1°$ defined by a binary signal from the constant signal generator 106 and a subtracted value $(K_1° - \theta_B°)$ is applied as a binary signal to the down counter 108 and the second calculation circuit 200. Then, in the second calculation circuit 200, the vaue $(K_1° - \theta_B°)$ is subtracted from the predetermined dwell angle $K_2°$, and a subtracted value $(K_1° - \theta_B° - K_2°)$ are counted down, as previously decribed, to generate a low level signal $i_1$ from the circuit 200. Thus, the low level signal $i_1$ is applied to the ignitor 9a to energize the ignition coil 9 at the dwell angle $K_2°$.

Meanwhile, in the down counter 108, the value $(K_1° - \theta_B°)$ are counted down to, as previously described, to generate an output signal h from the counter 108. When the second calculation circuit 200 generates a high level signal $i_2$ therefrom in response to the output signal h, the high level signal $i_2$ is applied as an ignition timing signal to the ignitor 9a to deenergize the ignition coil 9.

When the value $\theta_A°$ is smaller than the value $\theta_B°$, the comparator 109 generates a low level signal which is applied to the gate terminal of the selector 110. Then, the value $\theta_A°$ is selected and applied by the selector 110 as a binary signal to the discriminator 105 in response to the low level signal from the comparator 109. Further description of other operations in this embodiment is eliminated because it is the same as that of the previous embodiment.

Figure 14:
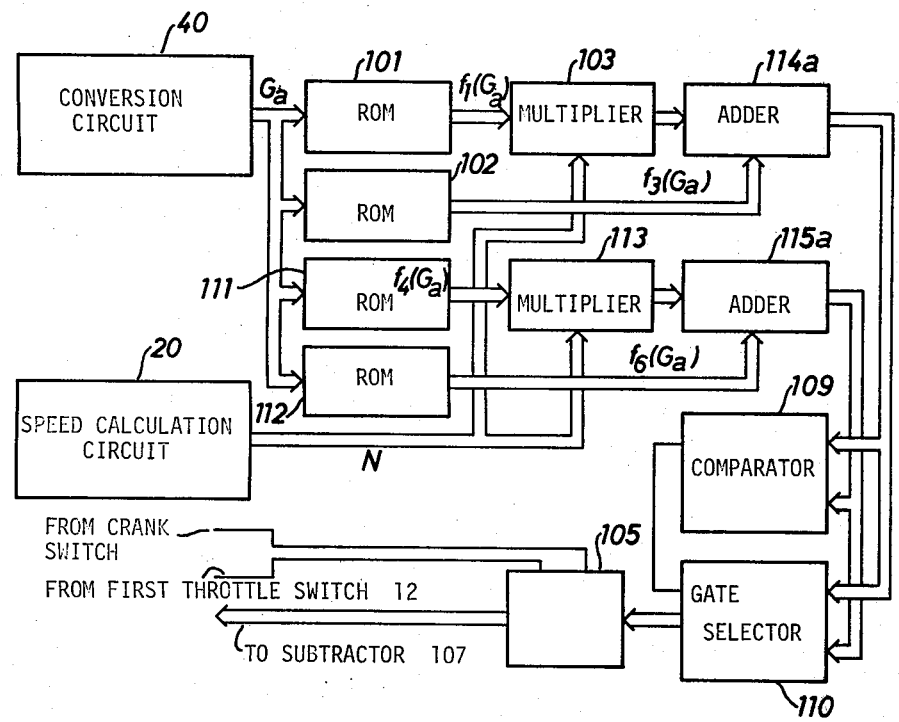
FIG. 14 illustrates a modified portion of the circuit diagram of the ignition control apparatus shown in FIG. 11.

In FIG. 14, there is illustrated a modification of the first calculation circuit 100A which is characterized in that ROMs 101, 102, 111 and 112 are connected to the conversion circuit 40 and the multipliers 103 and 113 are connected to the speed calculation circuit 20. In this modification, ROMs 101 and 102 respectively store therein the data indicating the parameters $f_1(G_a)$ and $f_3(G_a)$ in relation to the amount $G_a$ of the sucked air shown by I and II in FIG. 13 which are the same as in (a) and (b) of FIG. 8. ROMs 111 and 112 respectively store therein data indicating parameters $f_4(G_a)$ and $f_6(G_a)$ in relation to the amount $G_a$ of the sucked air shown by III and IV in FIG. 13 in replacement of the data in (c) and (d) of FIG. 5. The data shown by III and IV in FIG. 13 are obtained from a linear equation $\theta = f_4(G_a) \cdot N + f_5(G_a)$ shown by dotted lines of FIG. 12 in which the advance angle $\theta°$ is plotted in relation to the rotation speed N by utilizing the characteristic curve in FIG. 10. In this case, the parameter $f_6(G_a)$ is selected to satisfy the following relationship for compensation of a negative value of $f_5(G_a)$.

$$f_6(G_a) = f_5(G_a) + a \tag{4}$$

Thus, in ROMs 101, 102, 111 and 112, instant values of $f_1(G_a)$, $f_3(G_a)$, $f_4(G_a)$ and $f_6(G_a)$ are respectively read out as binary signals in relation to the amount $G_a$ of the sucked air defined by the binary signal from the conversion circuit 40.

The multiplier 103 receives the binary signal indicative of the value of $f_1(G_a)$ from ROM 101 and the binary signal indicative of the rotation speed N from the speed calculation circuit 20. In the multiplier 103, the value of $f_1(G_a)$ is multiplied by the rotation speed N, and a multiplied value $f_1(G_a) \cdot N$ is applied as a binary signal to an adder 114a. Then, the value $f_1(G_a) \cdot N$ is added in the adder 114a to the value of $f_3(G_a)$ defined by a binary signal read out in ROM 102, and an added value $\theta_A°$ or $\{f_1(G_a) \cdot N + f_3(G_a)\}$ is applied as a binary signal to the comparator 109 and the selector 110. Simultaneously, the multiplier 113 receives the binary signal indicative of the value of $f_4(G_a)$ from ROM 111 and the binary signal indicative of the rotation speed N from the speed calculation circuit 20. In the multiplier 113, the value of $f_4(G_a)$ is multiplied by the rotation speed N, and a multiplied value $f_4(G_a) \cdot N$ is applied as a binary signal to an adder 115a. Then, the value $f_4(G_a) \cdot N$ is added in the adder 115a to the value of $f_6(G_a)$ defined by a binary signal read out in ROM 112, and an added value $\theta_B°$ or $\{f_4(G_a) \cdot N + f_6(G_a)\}$ is applied as a binary signal to the comparator 109 and the selector 110.

Figure 15:
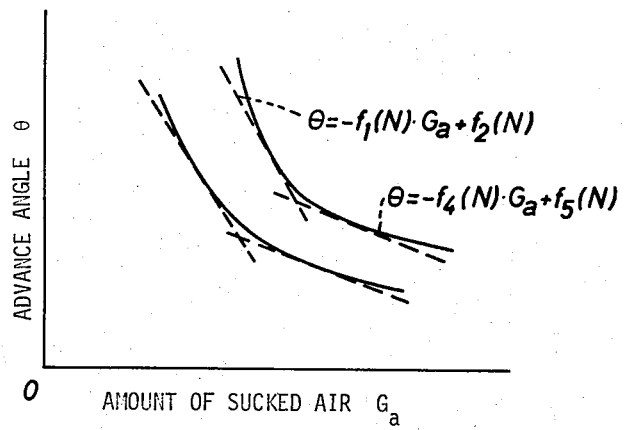
FIG. 15 depicts another graph indicative of an optimum advance angle in relation to an amount of the sucked air in consideration with engine detonation.

In addition, although in the above embodiment the parameter $f_4(N)$ is selected to be larger than the parameter $f_1(N)$, it may be smaller than the parameter $f_1(N)$ in accordance with a different kind of engine, for example as shown in FIG. 15.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. An electronic ignition control apparatus for an internal combustion engine having an output shaft rotated by a piston, an ignition coil adapted to generate a spark voltage upon deenergization of the primary winding thereof and a spark plug activated by the spark voltage to ignite the air-fuel mixture metered into a combustion chamber of said engine so as to operate said piston, the control apparatus comprising:
   a first signal generator for producing a first signal at a predetermined angular interval of rotation of said output shaft;
   a second signal generator for producing a second binary signal indicative of rotation speed N of said output shaft in response to the first signal;
   a third signal generator for producing a third binary signal indicative of an amount $G_a$ of air sucked into the combustion chamber of said engine in response to the first signal;
   first memory means for storing first data indicating a first parameter $f_1(N)$ in relation to the rotation speed N of said output shaft to produce a fourth binary signal indicative of an optimum value of said first parameter $f_1(N)$ in accordance with the second binary signal, said first parameter defining an ascent of a linear equation, $\theta = -f_1(N) \cdot G_a + f_2(N)$, representing a relationship between an optimum advance angle $\theta$ for activation of said spark plug and the amount $G_a$ of the sucked air in consideration with the rotation speed N of said output shaft;
   second memory means for storing second data indicating a second parameter $f_2(N)$ in relation to the rotation speed N of said output shaft to produce a fifth binary signal indicative of an optimum value of said second parameter $f_2(N)$ in accordance with the second binary signal, said second parameter defining an ordinates' intersection of the linear equation, $\theta = -f_1(N) \cdot G_a + f_2(N)$, in consideration with the rotation speed N of said output shaft;
   a calculation circuit for calculating the linear equation, $\theta = -f_1(N) \cdot G_a + f_2(N)$, in accordance with the third, fourth and fifth binary signals to obtain the optimum advance angle $\theta$ in relation to the amount $G_a$ of air; and
   a timing signal generator for generating a timing signal in accordance with the optimum advance angle $\theta$ such that the primary winding of said ignition coil is deenergized in response to the timing signal.

2. An electronic ignition control apparatus as claimed in claim 1, further comprising:
   third memory means for storing third data indicating a third parameter $f_4(N)$ in relation to the rotation speed N of said output shaft to produce a sixth binary signal indicative of an optimum value of said third parameter $f_4(N)$ in accordance with the second binary signal, said third parameter defining an ascent of a second linear equation, $\theta_B = -f_4(N) \cdot G_a + f_5(N)$, representing another relationship between an optimum advance angle $\theta_B$ for activation of said spark plug and the amount $G_a$ of the sucked air in consideration with the rotation speed N of said output shaft and a condition causing detonation in said engine;
   fourth memory means for storing fourth data indicating a fourth parameter $f_5(N)$ in relation to the rotation speed N of said output shaft to produce a seventh binary signal indicative of an optimum value of said fourth parameter $f_5(N)$ in accordance with the second binary signal, said fourth parameter defining an ordinates' intersection of said second linear equation, $\theta_B = -f_4(N) \cdot G_a + f_5(N)$, in consideration with the rotation speed N of said output shaft;
   a second calculation circuit for calculating the second linear equation, $\theta_B = -f_4(N) \cdot G_a + f_5(N)$, in accordance with the third, sixth and seventh binary signals to obtain the secondnamed optimum advance angle $\theta_B$ in relation to the amount $G_a$ of air;
   a comparator for comparing the first and second named optimum advance angles $\theta$, $\theta_B$ to produce an output signal therefrom; and
   means for selecting one of the first and second named optimum advance angles $\theta$, $\theta_B$ in accordance with the output signal from said comparator to generate the timing signal relative to the selected optimum advance angle.

3. An electronic ignition control apparatus as claimed in claim 1, wherein said calculation circuit comprises a multiplier for multiplying a value of the third binary signal by a value of the fourth binary signal to produce a sixth binary signal indicative of a multiplied value; and a subtractor for subtracting the multiplied value from a value of the fifth binary signal to obtain the optimum advance angle $\theta$ in relation to the amount $G_a$ of the sucked air.

4. An electronic ignition control apparatus as claimed in claim 2, wherein said first-named calculation circuit comprises a multiplier for multiplying a value of the third binary signal by a value of the fourth binary signal to produce an eighth binary signal indicative of a multiplied value, and a subtractor for subtracting the multiplied value from a value of the fifth binary signal to obtain the optimum advance angle $\theta$ in relation to the amount $G_a$ of the sucked air; and
   wherein said second calculation circuit comprises a multiplier for multiplying a value of the third binary signal by a value of the sixth binary signal to produce a ninth binary signal indicative of a multiplied value, and a subtractor for subtracting the second-named multiplied value from a value of the seventh binary signal to obtain the second-named optimum advance angle $\theta_B$ in relation to the amount $G_a$ of the sucked air.

5. An electronic ignition control apparatus for an internal combustion engine having an output shaft rotated by a piston, an ignition coil adapted to generate a spark voltage upon deenergization of the primary winding thereof and a spark plug activated by the spark voltage to ignite the airfuel mixture metered into a combustion chamber of said engine so as to operate said piston, the control apparatus comprising:
   a first signal generator for producing a first signal at a predetermined angular interval of rotation of said output shaft;

a second signal generator for producing a second binary signal indicative of rotation speed N of said output shaft in response to the first signal;

a third signal generator for producing a third binary signal indicative of the amount $G_a$ of air sucked into the combustion chamber of said engine in response to the first signal;

first memory means for storing first data indicating a first parameter $f_1(G_a)$ in relation to the amount $G_a$ of the sucked air to produce a fourth binary signal indicative of an optimum value of said first parameter $f_1(G_a)$ in accordance with the third signal, said first parameter defining an ascent of a linear equation, $\theta = f_1(G_a)N + f_2(G_a)$, approximately representing a relationship between an optimum advance angle $\theta$ for activation of said spark plug and the rotation speed N of said output shaft in consideration with the amount $G_a$ of the sucked air;

second memory means for storing second data indicating a second parameter $f_2(G_a)$ in relation to the amount $G_a$ of the sucked air to produce a fifth binary signal indicative of an optimum value of said second parameter $f_2(G_a)$ in accordance with the third binary signal, said second parameter defining an ordinates' intersection of the linear equation, $\theta = f_1(G_a) \cdot N + f_2(G_a)$, in consideration with the amount $G_a$ of the sucked air;

a calculation circuit for calculating the linear equation, $\theta = f_1(G_a)N + f_2(G_a)$, in accordance with the second, fourth and fifth binary signals to obtain the optimum advance angle $\theta$ in relation to the rotation speed N of said output shaft; and a timing signal generator for generating a timing signal in accordance with the optimum advance angle $\theta$ such that the primary winding of said ignition coil is deenergized in response to the timing signal.

6. An electronic ignition control apparatus as claimed in claim 5, further comprising:

third memory means for storing third data indicating a third parameter $f_4(G_a)$ in relation to the amount $G_a$ of the sucked air to produce a sixth binary signal indicative of an optimum value of said third parameter $f_4(G_a)$ in accordance with the third binary signal, said third parameter defining an ascent of a second linear equation, $\theta_B = f_4(G_a)N + f_5(G_a)$, representing another relationship between an optimum advance angle $\theta_B$ for activation of said spark plug and the rotation speed N of said output shaft in consideration with the amount $G_a$ of the sucked air and a condition causing detonation in said engine;

fourth memory means for storing a fourth data indicating a fourth parameter $f_5(G_a)$ in relation to the amount $G_a$ of the sucked air to produce a seventh binary signal indicative of an optimum value of said fourth parameter $f_5(G_a)$ in accordance with the third binary signal, said fourth parameter defining an ordinates' intersection of said second linear equation, $\theta_B = f_4(G_a)N + f_5(G_a)$, in consideration with the amount $G_a$ of the sucked air;

a second calculation circuit for calculating the second linear equation, $\theta_B = f_4(G_a)N + f_5(G_a)$, in accordance with the second, sixth and seventh binary signals to obtain the second-named optimum advance angle $\theta_B$ in relation to the rotation speed N of said output shaft;

a comparator for comparing the first and second named optimum advance angles $\theta, \theta_B$ to produce an output signal therefrom; and means for selecting one of the first and second named optimum advance angles $\theta, \theta_B$ in accordance with the output signal from said comparator to generate the timing signal relative to the selected optimum advance angle.

7. An electronic ignition control apparatus as claimed in claim 5, wherein said calculation circuit comprises a multiplier for multiplying a value of the second binary signal by a value of the fourth binary signal to produce a sixth binary signal indicative of a multiplied value; and an adder for adding the multiplied value to a value of the fifth binary signal to obtain the optimum advance angle $\theta$ in relation to the rotation speed N.

8. An electronic ignition control apparatus as claimed in claim 6, wherein said first-named calculation circuit comprises a multiplier for multiplying a value of the second binary signal by a value of the fourth binary signal to produce an eighth binary signal indicative of a multiplied value, and an adder for adding the multiplied value to a value of the fifth binary signal to obtain the optimum advance angle $\theta$ in relation to the rotation speed N; and wherein said second calculation circuit comprises a multiplier for multiplying a value of the second binary signal by a value of the sixth binary signal to produce a ninth binary signal indicative of a multiplied value, and an adder for adding the second-named multiplied value to a value of the seventh binary signal to obtain the second-named optimum advance angle $\theta_B$ in relation to the rotation speed N.

9. An electronic ignition control method for an internal combustion engine having an output shaft rotated by a piston, an ignition coil adapted to generate a spark voltage upon deenergization of the primary winding thereof and a spark plug activated by the spark voltage to ignite the air-fuel mixture metered into a combustion chamber of said engine so as to operate said piston, the method comprising the steps of:

automatically producing a first signal at a predetermined angular interval of rotation of said output shaft;

automatically producing a second binary signal indicative of rotation speed N of said output shaft in response to the first signal;

automatically producing a third binary signal indicative of the amount $G_a$ of air sucked into the combustion chamber of said engine in response to the first signal;

reading out first data preliminarily stored in a memory indicating a first parameter $f_1(N)$ in relation to the rotation speed N of said output shaft to automatically produce a fourth binary signal indicative of an optimum value of said first parameter $f_1(N)$ in accordance with the second binary signal, said first parameter defining an ascent of a linear equation, $\theta = -f_1(N)G_a + f_2(N)$, representing a relationship between an optimum advance angle $\theta$ for activation of said spark plug and the amount $G_a$ of the sucked air in consideration with the rotation speed N of said output shaft;

reading out second data preliminarily stored in a memory indicating a second parameter $f_2(N)$ in relation to the rotation speed N of said output shaft to automatically produce a fifth binary signal indicative of an optimum value of said second parameter $f_2(N)$ in accordance with the second binary signal, said second parameter defining an ordinates' intersection of the linear equation, $\theta = -f_1(N)\cdot G_a + f_2(N)$, in consideration with the rotation speed N of said output shaft;

automatically calculating the linear equation, $\theta = -f_1(N)G_a + f_2(N)$, in accordance with the third, fourth and fifth binary signals to obtain the optimum advance angle $\theta$ in relation to the amount $G_a$ of air; and automatically generating a timing signal in accordance with the optimum advance angle $\theta$ such that the primary winding of said ignition coil is deenergized in response to the timing signal.

10. An electronic ignition control method for an internal combustion engine having an output shaft rotated by a piston, an ignition coil adapted to generate a spark voltage upon deenergization of the primary winding thereof and a spark plug activated by the spark voltage to ignite the air-fuel mixture metered into a combustion chamber of said engine so as to operate said piston, the method comprising the steps of:

automatically producing a first signal at a predetermined angular interval of rotation of said output shaft;

automatically producing a second binary signal indicative of rotation speed N of said output shaft in response to the first signal;

automatically producing a third binary signal indicative of the amount $G_a$ of air sucked into the combustion chamber of said engine in response to the first signal;

reading out first data preliminarily stored in a memory indicating a first parameter $f_1(G_a)$ in relation to the amount $G_a$ of the sucked air to automatically produce a fourth binary signal indicative of an optimum value of said first parameter $f_1(G_a)$ in accordance with the third signal, said first parameter defining an ascent of a linear equation, $\theta = f_1(G_a)N + f_2(G_a)$, approximately representing a relationship between an optimum advance angle $\theta$ for activation of said spark plug and the rotation speed N of said output shaft in consideration with the amount $G_a$ of the sucked air;

reading out second data preliminarily stored in a memory indicating a second parameter $f_2(G_a)$ in relation to the amount $G_a$ of the sucked air to automatically produce a fifth binary signal indicative of an optimum value of said second parameter $f_2(G_a)$ in accordance with the third binary signal, said second parameter defining an ordinates' intersection of the linear equation, $\theta = f_1(G_a)N + f_2(G_a)$, in consideration with the amount $G_a$ of the sucked air;

automatically calculating the linear equation, $\theta = f_1(G_a)N + f_2(G_a)$, in accordance with the second, fourth and fifth binary signals to obtain the optimum advance angle $\theta$ in relation to the rotation speed N of said output shaft; and automatically generating a timing signal in accordance with the optimum advance angle $\theta$ such that the primary winding of said ignition coil is deenergized in response to the timing signal.

11. An electronic ignition control apparatus for an internal combustion engine having an output shaft rotated by a piston, an ignition coil adapted to generate a spark voltage upon deenergization of the primary winding thereof and a spark plug activated by the spark voltage to ignite the air-fuel mixture metered into a combustion chamber of said engine so as to operate said piston, the control apparatus comprising:

a first signal generator for producing a first binary signal indicative of rotation speed N of said output shaft;

a second signal generator for producing a second binary signal indicative of an amount $G_a$ of air sucked into the combustion chamber of said engine;

first memory means for storing first data indicating a first parameter $f_1(N)$ in relation to the rotation speed N of said output shaft to produce a third binary signal indicative of an optimum value of said first parameter $f_1(N)$ in accordance with the first binary signal, said first parameter defining an ascent of a linear equation, $\theta = -f_1(N)\cdot G_a + f_2(N)$, representing a relationship between an optimum advance angle $\theta$ for activation of said spark plug and the amount $G_a$ of the sucked air in consideration with the rotation speed N of said output shaft;

second memory means for storing second data indicating a second parameter $f_2(N)$ in relation to the rotation speed N of said output shaft to produce a fourth binary signal indicative of an optimum value of said second parameter $f_2(N)$ in accordance with the first binary signal, said second parameter defining an ordinates' intersection of the linear equation, $\theta = -f_1(N)\cdot G_a + f_2(N)$, in consideration with the rotation speed N of said output shaft;

a calculation circuit for calculating the linear equation, $\theta = -f_1(N)\cdot G_a + f_2(N)$, in accordance with the second, third and fourth binary signals to obtain the optimum advance angle $\theta$ in relation to the amount $G_a$ of air; and a timing signal generator for generating a timing signal in accordance with the optimum advance angle $\theta$ such that the primary winding of said ignition coil is deenergized in response to the timing signal.

12. An electronic ignition control apparatus for an internal combustion engine having an output shaft rotated by a piston, an ignition coil adapted to generate a spark voltage upon deenergization of the primary winding thereof and a spark plug activated by the spark voltage to ignite the air-fuel mixture metered into a combustion chamber of said engine so as to operate said piston, the control apparatus comprising:

a first signal generator for producing a first binary signal indicative of rotation speed N of said output shaft;

a second signal generator for producing a second binary signal indicative of the amount $G_a$ of air sucked into the combustion chamber of said engine;

first memory means for storing first data indicating a first parameter $f_1(G_a)$ in relation to the amount $G_a$ of the sucked air to produce a third binary signal indicative of an optimum value of said first parameter $f_1(G_a)$ in accordance with the second signal, said first parameter defining an ascent of a linear equation, $\theta = f_1(G_a)N + f_2(G_a)$, approximately representing a relationship between an optimum advance angle $\theta$ for activation of said spark plug and the rotation speed N of said output shaft in consideration with the amount $G_a$ of the sucked air;

second memory means for storing second data indicating a second parameter $f_2(G_a)$ in relation to the amount $G_a$ of the sucked air to produce a fourth binary signal indicative of an optimum value of said second parameter $f_2(G_a)$ in accordance with the second binary signal, said second parameter defining an ordinates' intersection of the linear equation, $\theta = f_1(G_a) \cdot N + f_2(G_a)$, in consideration with the amount $G_a$ of the sucked air;

a calculation circuit for calculating the linear equation, $\theta = f_1(G_a)N + f_2(G_a)$, in accordance with the first, third and fourth binary signals to obtain the optimum angle $\theta$ in relation to the rotation speed N of said output shaft; and a timing signal generator for generating a timing signal in accordance with the optimum advance angle $\theta$ such that the primary winding of said ignition coil is deenergized in response to the timing signal.

* * * * *